United States Patent [19]

Chapman

[11] Patent Number: 5,015,453
[45] Date of Patent: May 14, 1991

[54] CRYSTALLINE GROUP IVA METAL-CONTAINING MOLECULAR SIEVE COMPOSITIONS

[75] Inventor: David M. Chapman, Ellicott City, Md.

[73] Assignee: W. R. Grace & Co.-Conn., New York, N.Y.

[21] Appl. No.: 345,133

[22] Filed: Apr. 28, 1989

[51] Int. Cl.$^5$ ............................................. C01B 33/34
[52] U.S. Cl. ..................................... 423/306; 423/328
[58] Field of Search ........................ 423/326, 306, 328

[56] References Cited

U.S. PATENT DOCUMENTS

| | | | |
|---|---|---|---|
| 3,329,481 | 7/1967 | Young | 23/111 |
| 4,410,501 | 10/1983 | Taramasso et al. | |
| 4,707,345 | 11/1987 | Lok et al. | |

FOREIGN PATENT DOCUMENTS

| | | |
|---|---|---|
| 0158349 | 4/1985 | European Pat. Off. |
| 0158350 | 4/1985 | European Pat. Off. |
| 0158977 | 4/1985 | European Pat. Off. |
| 0161488 | 4/1985 | European Pat. Off. |
| 8504853 | 11/1985 | PCT Int'l Appl. |
| 8504856 | 11/1985 | PCT Int'l Appl. |
| 828936 | 2/1960 | United Kingdom |

OTHER PUBLICATIONS

J. Zemann, Isotypia Between Pharmacosiderite and Zeolitic Germanates, Acta. Crystl. (1959), 12, 252, (translation only, 3 pages).

H. Nowotny and A. Wittman, Zeolitic Alkali Germanates, Monatschefte fuer Chemie 85 (3): 558-74 (1954), (translation only, 26 pages).

*Primary Examiner*—Gary P. Straub
*Assistant Examiner*—Stuart L. Hendrickson

[57] ABSTRACT

Crystalline Group IVA metallosilicates, metallophosphates and metallophosphosilicates have a composition in terms of mole ratios of oxides in the synthesized and anhydrous state of:

$$A(M_2O):B(XO_2):C(SiO_2):D(P_2O_5) \qquad (I)$$

wherein
M is an alkali metal;
X is a Group IVA metal such a Ti and Zr;
A/B is a number from about 0.1 to about 2.0;
C/B is a number from about 0 to about 3.0; and
D/B is a number from about 0 to about 3.0.

They are prepared by a hydrothermal process. They can be used as ion exchange materials.

7 Claims, No Drawings

CRYSTALLINE GROUP IVA METAL-CONTAINING MOLECULAR SIEVE COMPOSITIONS

BACKGROUND OF THE INVENTION

1. Field of the Invention

The present invention relates to novel Group IVA metal-rich, crystalline molecular sieve compositions and their method of preparation and their use as ion exchange materials. These compositions are prepared hydrothermally from gels containing reactive Group IVA metals, silicon and phosphorous compounds and alkali metal cations.

2. Description of the Previously Published Art

Molecular sieves of the crystalline aluminosilicate type, usually referred to as zeolites, are well known in the art and now comprise a large number of species of both naturally occurring and synthetic compositions. In general these crystalline zeolites are formed by corner sharing $ALO_2$ and $SiO_2$ tetrahedra and are characterized by having pore openings of uniform dimensions, having a significant ion-exchange capacity and being capable of reversibly desorbing an adsorbed phase which is dispersed throughout the internal voids of the crystal without displacing any atoms which make up the permanent crystal structure.

In recent years, crystalline aluminophosphate compositions have been reported which are microporous framework oxide molecular sieves. These materials are formed from $AlO_2$ and $PO_2$ corner-shared tetrahedra, and their intracrystalline pore volumes and pore diameters are comparable to those known for the zeolites. These materials need not, however, have ion-exchange capacity.

The term "molecular sieve" refers to a material having a fixed, open network structure capable of reversibly desorbing an adsorbed phase, and that may be used to separate hydrocarbons or other mixtures by selective occlusion of one or more of the constituents. The network structure, however, does not necessarily need to be composed of vertex-shared tetrahedra as in the zeolites or the aforementioned aluminophosphates. Molecular sieves, both zeolitic and non-zeolitic, are known to have catalytic capabilities for various hydrocarbon conversion reactions such as alkylation, cracking, hydrocracking, isomerization, etc. Some also have capabilities for the conversion of nitrogen oxides as practiced in the art of exhaust pollution control. In addition, molecular sieves can exhibit capabilities as ion-exchange materials.

Substantial success in preparing titanium-containing zeolites and molecular sieve compositions have been reported by Lok et al in U.S. Pat. No. 4,707,345, EP 0161488, EP 0158349, EP 0158350, EP 0158977, WO 85/04853, WO 85/04856, and Taramasso et al in U.S. Pat. No. 4,410,501. These cited compositions involve the incorporation of titanium into silicate, aluminosilicate, phosphoaluminate and phosphoaluminosilicate frameworks composed of vertex shared tetrahedra. The compositions are microporous, crystalline zeolites and molecular sieves formed from corner sharing $PO_2$, $AlO_2$ and $SiO_2$ tetrahedra. In all of these patents the titanium is described as being present in the materials as the tetrahedral $TiO_2$ oxide. Furthermore, the titanium oxide contents of these cited materials are generally low, usually less than 10 wt % of the bulk material on an anhydrous basis. In the present invention, the novel Group IVA containing molecular sieves are structurally and chemically distinct from the above cited compositions as seen by comparison of the x-ray powder patterns and chemical compositions of the molecular sieve phases. Furthermore, the present Group IVA containing molecular sieves are composed of different framework structural units than the zeolites and molecular sieves familiar in the art, that is, they are composed of edge shared octahedra connected through their vertices to tetrahedra.

There are other known compositions of molecular sieve materials which are not composed solely of interconnected oxide tetrahedra, but which are composed of octahedral and tetrahedral framework constituents. A relevant example is the family of materials, discussed by J. Zeeman (*Acta Cryst,* 12, 1959, p. 252) that exhibit a molecular sieve structure in which the framework constituents have coordination numbers of both six and four. These materials are substantially similar structurally to the novel titanium containing molecular sieves described herein, but have distinctly different chemical compositions. The term "substantially similar" means that the relative arrangement of tetrahedral and octahedral units in the framework is described by the reported structure, but does not restrict the framework of the present invention to identical unit cell parameters, x-ray diffraction d-spacings or line intensities, or extra-framework atom locations. The reported compositions observed for these materials contain germanium (Nowotny et al, *Montash.,* 85, 1954, p. 558), iron and arsenic as in the mineral pharmacosiderite (Hagele, G. and Machatschki, F *Fortschr d. Mineralogie,* 21, 1937, p. 77) and aluminum and arsenic as in the mineral aluminopharmacosiderite (Zeeman, *Acta Cryst.* 12, 1959, p. 252). There are no previously reported examples of this structure that contain Group IVA metals as a framework constituent.

3. Objects of the Invention

It is an object of this invention to obtain a unique class of Group IVA metal silicates, Group IVA metal phosphates and Group IVA metal phosphosilicates which are microporous.

It is further object of this invention to obtain a unique class of Group IVA metal silicates, Group IVA metal phosphates and Group IVA metal phosphosilicates which have characteristics of both the aluminosilicate zeolites and the aluminosphosphate molecular sieves.

It is further object of this invention to obtain a unique class of Group IVA metal silicates, Group IVA metal phosphates and Group IVA metal phosphosilicates having a three-dimensional microporous crystal framework structure of tetrahedral and octahedral units.

It is further object of this invention to provide a process for the preparation of crystalline, microporous compositions containing Group IVA metals.

It is further object of this invention to provide crystalline, microporous compositions which possess activity for hydrocarbon conversions, exhaust effluent conversions, and which may be used as ion exchange media or adsorbents.

These and still further objects of the present invention will become readily apparent to one skilled in the art from the following detailed description and specific examples.

SUMMARY OF THE INVENTION

A novel class of Group IVA metal silicates, Group IVA metal phosphates and Group IVA metal phosphosilicates has been produced which are both microporous and exhibit properties which are characteristic of both the aluminosilicate zeolites and the aluminophosphate molecular sieves. Members of this novel class of Group IVA metal containing molecular sieves have a three-dimensional microporous crystal framework structure of tetrahedral and octahedral units.

In accordance with the present invention, the novel Group IVA metal silicates, Group IVA metal phosphates and Group IVA metal phosphosilicates are provided having an essential empirical chemical composition in terms of mole ratios of oxides in the synthesized and anhydrous state as follows:

$$A (M_2O): B(XO_2): C(SiO_2): D(P_2O_5) \quad (I)$$

wherein
M is an alkali metal;
X is a Group IVA metal;
A/B is a number from about 0.1 to about 2.0;
C/B is a number from about 0 to about 3.0; and
D/B is a number from about 0 to about 3.0.

By Group IVA metal we mean titanium (Ti), zirconium (Zr) and hafnium (Hf). The term "essential empirical chemical composition" is meant to include the crystal framework and can include any ion present in the pore system, but does not include other cations, anions or neutral species which can be present by virtue of being contained in the reaction mixture or as a result of post-synthesis ion exchange.

The Group IVA molecular sieves of one embodiment of this invention generally exhibit a powder x-ray diffraction pattern observed with Cu $k_\alpha$ rotation and a scan of 4° to 68° $2\theta$ of at least:

| d (Å) |
| --- |
| 7.8 ± 0.4 |
| 5.5 ± 0.2 |
| 4.5 ± 0.2 |
| 3.9 ± 0.1 |
| 3.4 ± 0.1 |
| 3.2 ± 0.1 |
| 2.7 ± 0.1 |
| 2.6 ± 0.1 |
| 2.4 ± 0.1 |
| 2.33 ± 0.05 |
| 2.23 ± 0.05 |
| 1.94 ± 0.05 |
| 1.88 ± 0.05 |
| 1.83 ± 0.02 |
| 1.74 ± 0.02 |
| 1.65 ± 0.02 |
| 1.58 ± 0.02 |
| 1.54 ± 0.02 |
| 1.50 ± 0.02 |
| 1.41 ± 0.02 |

The preferred embodiment of the present invention is a molecular sieve having a molar empirical formula similar to but not necessarily the same as the molar empirical formula $M_4 Ti_4 Si_3 O_{16} \cdot n H_2O$.

The preferred process for preparing these Group IVA metal-containing molecular sieves involves a hydrothermal synthesis under autogeneous pressure. The novel Group IVA metal-containing molecular sieves of formula I can be used in ion exchange reactions. The materials prepared in accordance with this invention may also be used as catalytic materials for hydrocarbon transformations, or as adsorbent materials.

DESCRIPTION OF THE PREFERRED EMBODIMENTS

The present molecular sieves are generally prepared by the hydrothermal crystallization of a reaction mixture prepared by combining reactive sources of at least an alkali metal oxide, a Group IVA metal or metal oxide source, silicon, phosphorous, water, or mixtures thereof.

Broadly, the preparative process comprises forming a reaction mixture of the components which when properly mixed will have a composition in terms of mole ratio of oxides as follows:

$$e\ M_2O\text{:}f\ XO_2\text{:}g\ SiO_2\text{:}h\ P_2O_5\text{:}n\ H_2O$$

wherein
M is an alkali metal;
X is a Group IVA metal;
g/f is a number from about 0 to about 55;
h/f is a number from about 0 to about 10;
e/f is a number from about 0.1 to about 10;
n/f is a number from about 0.1 to about 200.

Illustrative Group IVA metals include titanium and zirconium or combinations thereof. Generally, the Group IVA metal source will be in the form of a metal oxide, alkoxide, hydroxide, halide or metal salt. In the preferred embodiment, the Group IVA metal is titanium and the reactive titanium source includes, but is not limited to titanyl sulfate and titanium alkoxides, $Ti(OR)_4$, wherein $R = C_pH_{(2p+1)}$ and $p = 1$ to 8. The reactive silicon source includes, but is not limited to silicates, silica hydrogel, silicic acid, colloidal silica, tetraalkyl orthosilicates (silicon alkoxides) and silica hydroxides. The reactive phosphorous source includes, but is not limited to phosphoric acid and phosphoric oxides The alkali cation source is generally in the form of a compound containing a basic anion which will make the solution alkaline. Alkali hydroxides have been found to be suitable for this purpose The preferred cations are potassium and cesium The crystallization of the aforementioned novel Group IVA molecular sieve phases are generally not adversely affected by the presence of other compounds such as soluble salts in the reaction mixture.

In a preferred embodiment of the present invention, the composition of the reactive mixture is given as follows in terms of mole ratios of oxides:

$$e\ M_2O\text{:}f\ XO_2\text{:}g\ SiO_2\text{:}h\ P_2O_5\text{:}n\ H_2O$$

wherein
M is an alkali metal;
X is titanium;
g/f is a number from about 0.5 to about 3;
h/f is a number from about 0 to about 3;
e/f is a number from about 0.1 to about 2;
n/f is a number from about 10 to about 50.

Generally, the reaction mixture is then placed in a reaction vessel which is inert towards the reaction mixture such as polytetrafluoroethylene and heated at a temperature of at least about 70° C., preferably between about 125° C. to about 300° C. under autogeneous pressure The heating is continued until the reaction mixture is crystallized, usually a period from about 2 hours to about two weeks depending on the temperature of the preparation. In a preferred embodiment, the mixture is heated at a temperature between 150° C. and 225° C.

from about 4 hours to about 72 hours. The product is recovered by any convenient method such as centrifugation or filtration.

The compositions of matter according to the present invention are crystalline, microporous, 3-dimensional frameworks which contain a metal from Group IVA of the Periodic Table and silicon and/or phosphorous oxides.

The synthetic molecular sieve can be used as synthesized or can be thermally treated (calcined). Usually, it is desirable to remove the alkali metal cation by ion exchange and replace it with hydrogen, ammonium or any desired metal ion. The molecular sieve can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired. Typical replacing cations can include metal cations, e.g., rare earth, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be exchanged into the molecular sieve. The molecular sieve can also be impregnated with the metals, or, the metals can be physically intimately admixed with the molecular sieve using standard methods known to the art. And the metals can be occluded in the crystal lattice by having the desired metals present as ions in the reaction mixture from which the molecular sieve is prepared.

Typical ion exchange techniques involve contacting the synthetic molecular sieve with a solution containing a salt of the desired replacing cation or cations. Although a wide variety of salts can be employed, chlorides and other halides, nitrates, and sulfates are particularly preferred. Ion exchange can take place either before or after the molecular sieve is calcined Following contact with the salt solution of the desired replacing cation, the molecular sieve is typically washed with water and dried at temperatures ranging from 65° C. to about 315° C. After washing, the molecular sieve can be calcined in air or inert gas at temperatures ranging from about 200° C. to 820° C. for periods of time ranging from 1 to 48 hours, or more, to produce a catalytically active product especially useful in hydrocarbon conversion processes.

Regardless of the cations present in the synthesized form of the molecular sieve, the spatial arrangement of the atoms which form the basic crystal lattice of the molecular sieve remains essentially unchanged. The exchange of cations has little, if any, effect on the molecular sieve lattice structures.

The molecular sieve can be formed into a wide variety of physical shapes Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded The molecular sieve can be composited with other materials resistant to the temperatures and other conditions employed in organic conversion processes. Such matrix materials include active and inactive materials and synthetic or naturally occurring zeolites as well as inorganic materials such as clays, silica and metal oxides. The latter may be naturally occurring or may be in the form of gelatinous precipitates, sols, or gels, including mixtures of silica and metal oxides Use of an active material in conjunction with the synthetic molecular sieve, combined with it, can improve the conversion and selectivity of the catalyst in certain organic conversion processes. Inactive materials can serve as diluents to control the amount of conversion in a given process so that products can be formed economically without using other means for controlling the rate of reaction. Frequently, molecular sieve materials have been incorporated into naturally occurring clays, e.g., bentonite and kaolin. These materials, i.e., clays, oxides, etc., function, in part, as binders for the catalyst. It is desirable to provide a catalyst having good crush strength and attrition resistance, because in petroleum refining the catalyst is often subjected to rough handling. This tends to break the catalyst down into powders which cause problems in processing.

In addition to the foregoing materials, the molecular sieve can be composited with porous matrix materials and mixtures of matrix materials such as silica, alumina, titania, magnesia, silica-alumina, silica-magnesia, silica-zirconia, silica-thoria, silica-beryllia, silica-titania, titania-zirconia as well as ternary compositions such as silica-alumina-thoria, silica-alumina-zirconia, silica-alumina-magnesia and silica-magnesia-zirconia. The matrix can be in the form of a cogel.

The molecular sieve can also be composited with zeolites such as synthetic and natural faujasites (e.g., X and Y), erionites, and mordenites. They can also be composited with purely synthetic zeolites. The combination of molecular sieve and zeolites can also be composited in a porous inorganic matrix.

Having described the basic aspects of our invention, the following examples are given to illustrate specific embodiments thereof.

EXAMPLE 1

This is an example of the preparation of the novel crystalline titanium phosphosilicate material To 60.0 g colloidal silica (Ludox AS, 40% silica) was added 138.3 g $H_3PO_4$ (85%). Then to this mixture 136.88 g of titanium tetraethoxide (Aldrich, ethanol stabilized) was added with stirring The resultant thick gel was homogenized, then roto-evaporated to remove excess water and ethanol The final weight of the gel was 480 g. To a 40 g portion of the above gel was added 30 ml of 10 KOH. The gel had a pH of 11.8 and it was then homogenized. The final composition of the gel on a molar basis was:

6.06 $H_3PO_4$, 2.0 $SiO_2$, 3 $TiO_2$, 18 KOH, about 116 $H_2O$

It was autoclaved under autogeneous pressure in a teflon-lined Parr autoclave at 200° C. for 48 hours. The solid product was isolated by repeated centrifugation/dilution with distilled water The chemical analysis of the recovered solids, on an anhydrous weight basis, was:

| | |
|---|---|
| $TiO_2$ | 45.9% |
| $K_2O$ | 29.5 |
| $SiO_2$ | 37.7 |

-continued

| | |
|---|---|
| $P_2O_5$ | 0.75 |

Thus, on a molar, anhydrous basis, the composition of the recovered solids was:

0.313 $K_2O$: 0.575 $TiO_2$: 0.627 $SiO_2$: 0.005 $P_2O_5$

The loss of weight after calcination of the hydrous material at 550° C. was 13.7%. The x-ray powder diffraction pattern of the titanium phosphosilicate was observed with Cu $k_\alpha$ radiation and a scan of 4° to 68° $2\alpha$ and was characterized by the following data:

TABLE A

| $2\theta$ | d (AU) | 100 × I/Io |
|---|---|---|
| 11.78 | 7.5 | 73 |
| 16.52 | 5.37 | 10 |
| 20.18 | 4.41 | 22 |
| 23.30 | 3.82 | 30 |
| 28.64 | 3.12 | 100 |
| 33.14 | 2.70 | 50 |
| 35.12 | 2.56 | 39 |
| 37.10 | 2.42 | 49 |
| 38.96 | 2.31 | 27 |
| 40.70 | 2.22 | 21 |
| 44.18 | 2.05 | 19 |
| 47.38 | 1.92 | 27 |
| 48.90 | 1.86 | 30 |
| 50.42 | 1.81 | 32 |
| 51.86 | 1.76 | 12 |
| 53.30 | 1.72 | 23 |
| 54.76 | 1.68 | 14 |
| 58.88 | 1.57 | 22 |
| 60.20 | 1.54 | 32 |
| 62.72 | 1.48 | 17 |
| 66.56 | 1.40 | 21 |

Where AU = Angstrom unit

The above x-ray powder diffraction pattern was matched to the pattern for $KH_3Ge_2O_6$ on Card #31-1026 of the 1984 JCPDS Powder Diffraction File, which is characterized by the following data:

| $2\theta$ | d (Au) | 100 × I/Io |
|---|---|---|
| 11.5 | 7.7 | 100 |
| 16.31 | 5.44 | 6 |
| 19.977 | 4.44 | 40 |
| 23.215 | 3.83 | 40 |
| 28.472 | 3.14 | 100 |
| 33.053 | 2.71 | 60 |
| 36.944 | 2.43 | 60 |
| 38.905 | 2.31 | 40 |
| 40.596 | 2.22 | 15 |
| 44.102 | 2.05 | 15 |
| 47.072 | 1.93 | 6 |
| 48.910 | 1.86 | 15 |
| 50.369 | 1.81 | 25 |
| 51.544 | 1.77 | 4 |
| 53.217 | 1.72 | 25 |
| 54.605 | 1.68 | 6 |
| 58.720 | 1.57 | 10 |
| 60.042 | 1.54 | 16 |
| 62.713 | 1.48 | 15 |
| 66.792 | 1.40 | 10 |

As will be understood by those skilled in the art, the exact position ($2\theta$) and intensities of the peaks in Tables A and B depend on the chemical constituents of the unit cell of the crystalline material. Differences between the peak positions and intensities observed between Table A and B are the result of chemical differences between the samples, and are not sufficient to prevent positive identification of the structural similarity of the two materials. The structure of $KH_3Ge_2O_6$ was later solved in *Montash*, 85, 1954, p. 558 such that the unit cell contents are described by $M_3H\ Ge_7O_{16}$ (4 $H_2O$).

EXAMPLE 2

This example describes the preparation of a mixture of titanium and silicon oxides that will be used in subsequent examples for the crystallization of the novel titanium molecular sieve. 300 ml of deionized $H_2O$ was added to 150 gms Ludox AS40 (Dupont, 40% $SiO_2$). To this mixture was added 120 gms titanium tetraethoxide [Ti(OEt)$_4$, Aldrich, ethanol stabilized]. This mixture was then homogenized on a Brinkman homogenizer, and roto-evaporated until dry. 170 ml $H_2O$ were added to the solids, and this mixture was rehomogenized. The total weight of the colloidal suspension was 300 gms. This particular gel is referred to below as Gel A.

EXAMPLE 3

This example describes the crystallization of the novel titanium molecular sieve using Gel A from Example 2 and potassium as cation. To one twelfth of Gel A from Example 2 was added 18 ml of 5N KOH. This mixture was homogenized thoroughly. The final composition of the gel, on a molar basis, was approximately 0.54 $K_2O$: 1.0 $SiO_2$: 0.5 $TiO_2$: 20 $H_2O$.

This mixture was then autoclaved under autogenous pressure in a teflon lined Parr autoclave for 45 hours at 200° C. The solid product was isolated by repeated centrifugation/dilution with distilled water. The chemical analysis of the recovered solids, on an anhydrous weight basis, was:

$K_2O$ 11.8
$TiO_2$ 51.2
$SiO_2$ 37.0

Thus, on a molar, anhydrous basis, the composition of the recovered solids was:

0.125 $K_2O$: 0.641 $TiO_2$: 0.616 $SiO_2$: 0.0 $P_2O_5$

The loss of weight after calcination of the hydrous material at 550° C. was 15.8%. The x-ray pattern of the product was substantially similar to the pattern described in Table A in Example 1.

EXAMPLE 4

This example describes the crystallization of the novel titanium molecular sieve using Gel A from Example 2 and cesium as cation. To one twelfth of Gel A from Example 2 was added 18 ml of 6.7 N CsOH. This mixture was homogenized thoroughly. The final composition of the gel, on a molar basis, was approximately 0.72 $Cs_2O$: 1.0 $SiO_2$: 0.5 $TiO_2$: 20 $H_2O$.

This mixture was then autoclaved under autogenous pressure in a teflon lined Parr autoclave for 45 hours at 200° C. The solid product was isolated by repeated centrifugation/dilution with distilled water. The chemical analysis of the recovered solids, on an anhydrous weight basis, was:

$Cs_2O$ 46.5
$TiO_2$ 31.9

Thus, on a molar, anhydrous basis, the composition of the recovered solids was:

0.165 $Cs_2O$: 0.399 $TiO_2$: 0.359 $SiO_2$: 0.0 $P_2O_5$

The loss of weight after calcination of the hydrous material at 550° C. was 13.3%. The x-ray pattern of this product was substantially similar to the pattern described in Table A in Example 1.

EXAMPLE 5

The following example describes the crystallization of the novel titanium molecular sieve from gels that contain phosphate, using potassium as cation. 115.3 gms of 85% $H_3PO_4$ was added to 90 gms Ludox AS40 (Dupont, 40% silica). To this stirred mixture was added 137 gms titanium tetraethoxide (Aldrich, ethanol stabilized). The resulting gel was homogenized and then rotoevaporated until most of the liquid had evaporated. 150 ml $H_2O$ was then added to the solids and this slurry was homogenized. The final weight of the gel was 528 gms.

It was aged at ambient temperature for 6 days. To one twelfth of the gel was added 30 ml 10 N KOH. This final mixture was homogenized. The composition of the gel, on a molar basis, was 9.5 $K_2O$: 3.0 $TiO_2$: 2.6 $P_2O_5$: 3.2 $SiO_2$: 165 $H_2O$.

This mixture was then autoclaved under autogenous pressure in a teflon lined Parr autoclave for 48 hours at 200° C. The solid product was isolated by repeated centrifugation/dilution with distilled water. The chemical analysis of the recovered solids, on an hydrous weight basis, was:
$K_2O$ 24.6
$TiO_2$ 37.3
$P_2O_5$ 2.34
$SiO_2$ 35.7

Thus, on a molar, anhydrous basis, the composition of the recovered solids was:

0.261 $K_2O$: 0.467 $TiO_2$: 0.594 $SiO_2$: 0.0165 $P_2O_5$

The loss of weight after calcination of the hydrous material at 550° C. was 5.7%. The x-ray pattern of this product was substantially similar to the pattern described in Table A in Example 1.

EXAMPLE 6

The following example describes the crystallization of the novel titanium molecular sieve in the presence of phosphate and using sodium as cation. 138.3 gms of 85% phosphoric acid was added to 120.2 gms Ludox AS40 (Dupont). To the stirred mixture was added 136.9 gms titanium tetraethoxide (Aldrich, ethanol stabilized), and the gel produced was homogenized thoroughly. 150 ml water was then added and the gel homogenized again. To one twelfth of the final gel was added 30 ml of 10 N NaOH, so that the composition on a molar basis, was 9.5 $Na_2O$: 3.0 $TiO_2$: 3.2 $P_2O_5$: 4.2 $SiO_2$: 12 $C_2H_5OH$: 150 $H_2O$.

This mixture was then autoclaved under autogenous pressure in a teflon lined Parr autoclave for 48 hours at 200° C. The solid product was isolated by repeated centrifugation/dilution with distilled water. The chemical analysis of the recovered solids, on an anhydrous weight basis, was:
$Na_2O$ 22.0
$TiO_2$ 28.1
$P_2O_5$ 23.1
$SiO_2$ 17.3

Thus, on a molar, anhydrous basis, the composition of the recovered solids was:

0.355 $Na_2O$: 0.352 $TiO_2$: 0.288 $SiO_2$: 0.163 $P_2O_5$

The loss of weight after calcination of the hydrous material at 550° C. was 7.3%. The x-ray pattern of this product was substantially similar to the pattern described in Table A in Example 1.

EXAMPLE 7

This example describes the crystallization of the novel titanium molecular sieve using titanyl sulfate as the titanium source and Cs as cation. 70 gms Ludox AS40 (Dupont) was added to 212 gms of stirred $TiOSO_4$ solution (Kemira Uniti 992, 9.2% $TiO_2$). To this very acidic mixture immersed in an ice bath was slowly added 205 ml of 10 N NaOH. This gel was homogenized and aged overnight. It was then centrifuged, decanted and the solids were slurried with water a total of three times. 366 gms of $H_2O$ was added to the solids and the mixture homogenized. To one sixth of this gel was added 18 mls of 6.7 N CsOH solution. The mixture was homogenized and the final composition, on a molar basis, was 0.72 $Cs_2O$: 1.0 $SiO_2$: 0.5 $TiO_2$: 47 $H_2O$.

This mixture was then autoclaved under autogenous pressure in a teflon lined Parr autoclave for 45 hours at 200° C. The solid product was isolated by repeated centrifugation/dilution with distilled water The chemical analysis of the recovered solids, on an anhydrous weight basis, was:
$Cs_2O$ 49.2
$TiO_2$ 30.9
$SiO_2$ 19.8

Thus, on a molar, anhydrous basis, the composition of the recovered solids was:

0.175 $Cs_2O$: 0.387 $TiO_2$: 0.329 $SiO_2$: 0.0 $P_2O_5$

The loss of weight after calcination of the hydrous material at 550° C. was 11.0%. The x-ray pattern of this product was substantially similar to the pattern described in Table A in Example 1.

EXAMPLE 8

This example describes the crystallization of the novel titanium molecular sieve using potassium as cation but with a different gel composition. 60 gms titanium tetraethoxide (Aldrich, ethanol stabilized) was added to 28 gms Ludox AS40 (Dupont) To this mixture was added 14 gms KOH in 19 ml $H_2O$. The gel was homogenized and dried at 100° C. The total weight of the solids was 45 gms. To 30 gms of these solids were added 50 gms $H_2O$. This mixture was homogenized. The final gel composition, on a molar basis, was 2.09 $K_2O$: 4.0 $TiO_2$: 3.1 $SiO_2$: 69 $H_2O$.

This mixture was then autoclaved under autogenous pressure in a teflon lined Parr autoclave for 48 hours at 200° C. The solid product was isolated by repeated centrifugation/dilution with distilled water. The chemical analysis of the recovered solids, on an anhydrous weight basis, was:
$K_2O$ 51.8
$TiO_2$ 21.2
$SiO_2$ 26.9

Thus, on a molar, anhydrous basis, the composition of the recovered solids was:

0.225 $K_2O$: 0.648 $TiO_2$: 0.448 $SiO_2$: 0.0 $P_2O_5$

The loss of weight after calcination of the hydrous material at 550° C. was 15.8%. The x-ray pattern of this product was substantially similar to the pattern described in Table A in Example 1.

EXAMPLE 9

This example demonstrates the ion exchange capabilities of the composition of Example 4. One gm of the product from Example 4 was slurried in 20 cc $H_2O$. To this mixture was added 2 ml 15.9 N $HNO_3$. This mixture was heated to boiling for 1 hour. The product was isolated by filtration. The procedure was then repeated 2 more times to give a total of three exchanges in $HNO_3$. The samples were then washed with distilled water, dried at 100° C. and analyzed. The hydrogen ion exchanged titanium silicate had the following composition on a molar ratio basis:

| Example 4 | Cs/Ti = 0.82 |
|---|---|
| Example 9 | Cs/Ti = 0.30 |

The x-ray powder pattern for the hydrogen ion exchanged material is substantially similar to the pattern set forth in Example 1, demonstrating that the material maintains its crystallinity after ion exchange.

It is understood that the foregoing detailed description is given merely by way of illustration and that many variations may be made therein without departing from the spirit of this invention.

I claim:

1. A process for preparing a crystalline Group IVA metal containing molecular sieves having a composition in terms of mole ratio of oxides in the synthetized and anhydrous state of:

$$A(M_2O):B(XO_2):C(SiO_2):D(P_2O_5)$$

wherein
M is an alkali metal;
X is a Group IVA metal selected from the group consisting of titanium, zirconium, hafnium, and mixtures thereof;
A/B is a number from about 0.1 to about 2.0;
C/B is a number greater than 0 to about 3.0; and
D/B is a number from 0 to about 3.0, said process said process comprising forming a mixture of appropriate sources selected from the group consisting of a source of Group IVa metal, a source of silica and a source of phosphorous; stirring said mixture; adding to said mixture an alkali cation source to form a reaction solution; heating said reaction mixture at a temperature of at least 100° C. under autogenous pressure until crystals are formed; and recovering said crystals from said reaction mixture, said crystals having a powder x-ray diffraction pattern observed with Cu $k\alpha$ radiation and a scan of 4° to 68° $2\theta$ of at least the d-spacings set forth in the following Table A which were measured relative to an internal standard:

TABLE A

| d(Å) |
|---|
| 7.8 ± 0.4 |
| 5.5 ± 0.2 |
| 4.5 ± 0.2 |
| 3.9 ± 0.2 |
| 3.2 ± 0.1 |
| 2.7 ± 0.1 |
| 2.6 ± 0.1 |
| 2.4 ± 0.1 |
| 2.33 ± 0.05 |
| 2.23 ± 0.05 |
| 1.94 ± 0.05 |
| 1.88 ± 0.05 |
| 1.83 ± 0.02 |

TABLE A-continued

| d(Å) |
|---|
| 1.74 ± 0.02 |
| 1.65 ± 0.02 |
| 1.58 ± 0.02 |
| 1.54 ± 0.02 |
| 1.50 ± 0.02 |
| 1.41 ± 0.02 |

2. A crystalline molecular sieve having a three-dimensional microporous framework structure and having a composition in terms of mole ratios of oxides in the synthesized and anhydrous state of:

$$A (M_2O):B(XO_2):C(SiO_2):D(P_2O_5) \qquad (I)$$

wherein
M is a alkali metal;
X is a Group IVA metal selected from the group consisting of titanium, zirconium, hafnium, and mixtures thereof;
A/B is a number from about 0.1 to about 2.0:
C/B is a number greater than 0 to about 3.0; and
D/B is a number from about 0 to about 3.0; and
having a powder x-ray diffraction pattern observed with Cu $k\alpha$ radiation and a scan of 4° to 68° $2\theta$ of at least the d-spacings set forth in the following Table A which were measured relative to an internal standard:

TABLE A

| d(Å) |
|---|
| 7.8 ± 0.4 |
| 5.5 ± 0.2 |
| 4.5 ± 0.2 |
| 3.9 ± 0.2 |
| 3.2 ± 0.1 |
| 2.7 ± 0.1 |
| 2.6 ± 0.1 |
| 2.4 ± 0.1 |
| 2.33 ± 0.05 |
| 2.23 ± 0.05 |
| 1.94 ± 0.05 |
| 1.88 ± 0.05 |
| 1.83 ± 0.02 |
| 1.74 ± 0.02 |
| 1.65 ± 0.02 |
| 1.58 ± 0.02 |
| 1.54 ± 0.02 |
| 1.50 ± 0.02 |
| 1.41 ± 0.02 |

3. The composition of claim 2, wherein the Group IVA metal is titanium.

4. The process of claim 1, wherein the forming reaction mixture has a composition in terms of mole ratio of oxides of:

$$e\ M_2O{:}f\ XO_2{:}g\ SiO_2{:}h\ P_2O_5{:}n\ H_2O$$

wherein
M is an alkali metal;
X is a Group IVA metal;
g/f is a number from about 0 to about 55;
h/f is a number from about 0 to about 10;
e/f is a number from about 0.1 to about 10;
n/f is a number from about 0.1 to about 200.

5. The process of claim 1, wherein said source of Group IVA metal is in the form of a metal oxide or alkoxide, said source of phosphorous is phosphoric acid or phosphate salts, said source of silica is colloidal silica and said alkali cation source is in the form of an alkali hydroxide.

6. The process of claim 5, wherein said Group IVA metal is titanium.

7. The process of claim 6, wherein said alkali cation is a potassium cation.

* * * * *